United States Patent [19]

Norton

[11] Patent Number: 4,465,418
[45] Date of Patent: Aug. 14, 1984

[54] SUSPENSION FOR RING DRIVE SILO UNLOADER

[75] Inventor: Larry A. Norton, Elkhorn, Wis.

[73] Assignee: Starline Products, Inc., Harvard, Ill.

[21] Appl. No.: 352,388

[22] Filed: Feb. 25, 1982

[51] Int. Cl.³ .............................................. B65G 65/36
[52] U.S. Cl. .................................... 414/313; 406/114
[58] Field of Search ............................... 414/313–322; 406/114

[56] References Cited

U.S. PATENT DOCUMENTS 3,512,661  5/1970  Slieter .
4,132,450  1/1979  Hansen .
4,227,836  10/1980  Sizelove et al. .

Primary Examiner—Robert G. Sheridan
Attorney, Agent, or Firm—Wood, Dalton, Phillips, Mason & Rowe

[57] ABSTRACT

A silo unloader is of the type which has three support arms, and three suspension cables connected to the support arms are trained over sheaves on a tripod in the top of the silo and connected to a winch on the outside of the silo wall by means of which the unloader is raised and lowered; and a filler spout is used for loading material into the top of the silo. The cable connection to one of the support arms is constructed to permit the point of attachment of the cable to be moved relative to the support arm so the unloader may occupy either a horizontal working position for unloading, or, an inclined position when it is raised for filling the silo; and in the inclined position the high side of the unloader is above the filler spout.

11 Claims, 5 Drawing Figures

U.S. Patent  Aug. 14, 1984  4,465,418
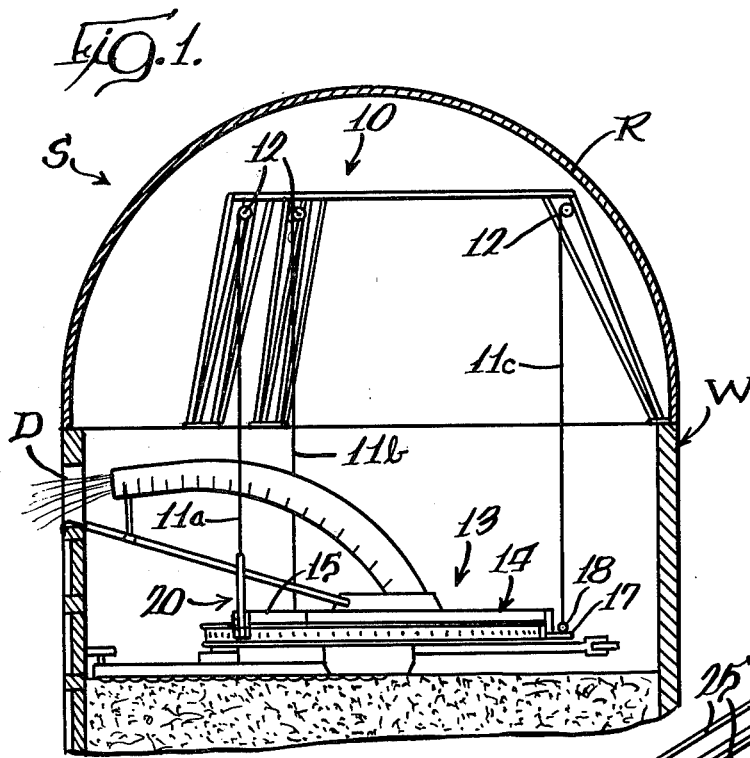
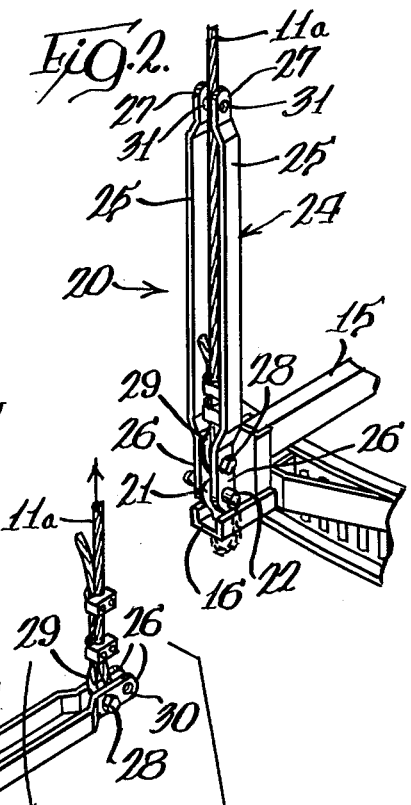
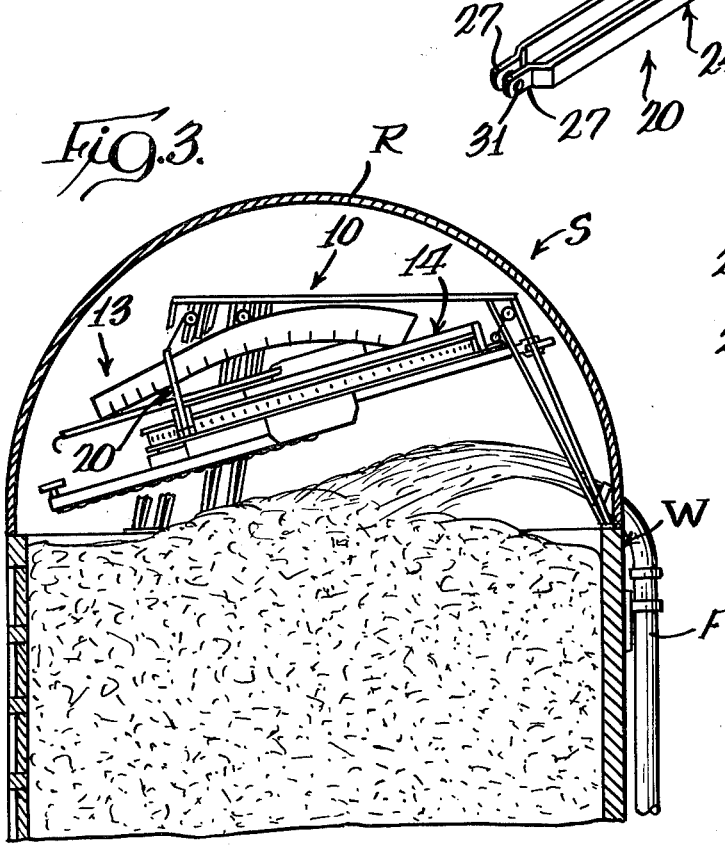
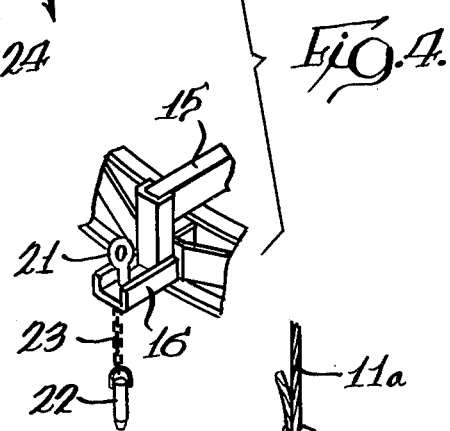
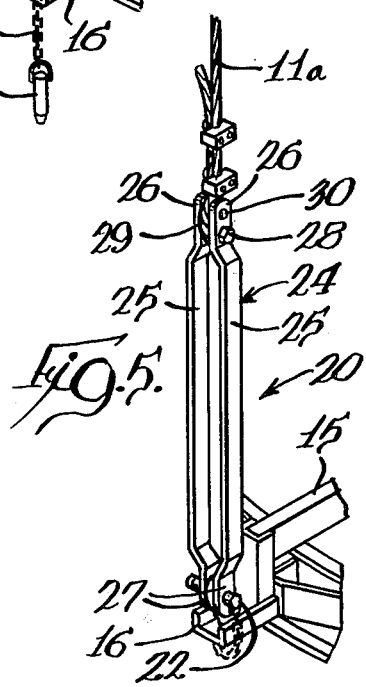

SUSPENSION FOR RING DRIVE SILO UNLOADER

BACKGROUND OF THE INVENTION

Top silo unloaders are suspended from a tripod which is supported upon the top of the silo wall and extends into the domed silo roof. Those silo unloaders which have a drive ring are provided with three horizontal support arms the outer ends of which are outside the perimeter of the drive ring, and suspension cables which are trained over sheaves in the upper part of the tripod are secured to the outer ends of the support arms so that the silo unloader may be moved vertically in the silo by operation of a winch near the base of the silo.

When a silo is to be filled, the unloader must be raised high enough to avoid or minimize interference with the incoming material.

If the silo unloader is too low some of the incoming material will drop onto the cutter-conveyor pickup arm and other components. This results in severe overloading of the supporting tripod and can cause damage to or collapse of the tripod. In addition, these lower silo unloader components will intercept or deflect the incoming silage stream and thus prevent the desired even and symmetrical placement of material across the entire area of the silo.

The silo unloader discharge chute may be removed; but even so the vertical height of the unloader and the span across the support arms usually prevents raising the unloader high enough to prevent the pickup arm from interfering seriously with the incoming material.

U.S. Pat. No. 4,227,836, owned by applicants assignee, discloses and claims one structure for permitting a silo unloader to be raised high enough into the silo roof to minimize interference with loading of silage.

U.S. Pat. No. 4,132,450 discloses a cable connection for a silo unloader of the type which is suspended by a single cable at the center of the silo roof, and which has a movable cable connection which permits the unloader to be hung in a substantially horizontal working position or in an inclined position when it is elevated for filling the silo.

U.S. Pat. No. 3,512,661 discloses a silo unloader of the single cable suspension type which has an adjustment for the connection between the suspension cable and the silo unloader so as to vary the pressure of the silo unloader sweep arm against the silo wall in use. The suspension is such that it necessarily causes the silo unloader to occupy an inclined position when it is elevated into the roof of the silo.

SUMMARY OF THE INVENTION

In accordance with the present invention, a silo unloader is of the type which has three support arms, and three suspension cables connected to the support arms which are trained over sheaves on a tripod in the top of the silo and connected to a winch on the outside of the silo wall by means of which the unloader is raised and lowered; and a filler spout is used for loading material into the top of the silo. In accordance with the invention, the cable connection to one of the support arms includes means for moving the point of attachment of the cable relative to the support arm so the unloader may occupy a horizontal working position and may occupy a inclined position when it is raised for filling the silo, and in the inclined position the unloader has its high side above the filler spout.

The result of the present invention is that the part of the silo unloader which is most in the way when the silo is being filled is raised high enough to get it out of the way, and the inclined position of the silo unloader permits it to fit into the domed roof of the silo better than does an unloader which always occupies a horizontal position.

THE DRAWINGS

FIG. 1 is a fragmentary transverse sectional view of the upper portion of a silo equipped with a silo unloader having a suspension system embodying the invention, with the unloader in its working position and discharging silage through one of the doors in the silo wall;

FIG. 2 is a fragmentary perspective view showing the movable cable connection of the invention when the silo unloader is in its horizontal working position;

FIG. 3 is a view similar to FIG. 1 with the filler spout in place on the silo and the silo unloader raised into the roof of the silo in its inclined position;

FIG. 4 is a view similar to FIG. 2 illustrating the parts of the adjustable cable connection while an adjustment is being made; and FIG. 5 is a view like FIG. 2 illustrating the adjustable cable connection with the parts in the positions that they occupy when the silo unloader is in the inclined position of FIG. 3.

DETAILED DESCRIPTION OF THE INVENTION

Referring to FIGS. 1 and 3, a silo, indicated generally at S, has a wall W which usually is surmounted by a hemispherical roof R. Surmounting the wall W is a tripod, indicated generally at 10, and first, second and third suspension cables 11a, 11b and 11c, respectively, are trained over sheaves 12 hung from the upper part of the tripod 10. As described in U.S. Pat. No. 4,227,836, the cables 11a, 11b and 11c are connected to a winch on the outside of the silo wall W near the base of the silo. A silo unloader, indicated generally at 13, is hung from the suspension cables so that it may be moved vertically in the silo S (by operation of the winch) between a working position for unloading as illustrated in FIG. 1 and a raised position illustrated in FIG. 3 for filling the silo.

The silo unloader 13 is of the same well known type discribed generally in U.S. Pat. No. 4,227,836, so for purposes of the present disclosure the only components which need to be specifically identified are a support arm assembly, indicated generally at 14, a first arm 15 of the support arm assembly, and a cable attaching bracket 16 on the outer end of the first support arm 15 which has counterparts, one shown at 17 in FIG. 1, on second and third arms of the support arm assembly 14, and said brackets are beneath the corresponding cables 11a, 11b and 11c. Each arm of the support arm assembly has a fixed element in the form of an eye such as the eye 18 on the bracket 17 and the eye 21 on the bracket 16. The first support arm 15 has first connecting means, indicated generally at 20, which constitutes the preferred means for accomplishing the purpose of the present invention—i.e., to move the point of attachment of the first cable 11a relative to the support arm 15 so the fixed element 21 on the first unloader 13 may selectively occupy the horizontal working position for unloading, illustrated in FIG. 1, or the inclined position when it is raised for filling the silo, as illustrated in FIG. 3.

Referring now particularly to FIGS. 2, 4 and 5, a pull pin 22 is secured to the bracket 16 adjacent the eye 21 by a short length of chain 23.

The first connecting means includes upright arms means, indicated generally at 24, consisting of a pair of spaced arm members 25, which have inwardly offset extremities 26 at a first end and 27 at a second end. Between the offset extremities 26 is a cross pintle 28 which is mounted on both the offset portions 26 and serves the dual functions of securing the arms members 25 together and providing a pivot for a loop 29 in the lower end of the first cable 11a by means of which said cable is pivotally connected to the upright arm means 24. In the offset extremities 26 of the arm members are aligned holes 30, and in the offset extremities 27 are aligned holes 31. As seen in FIGS. 2 and 5, in both positions of adjustment of the upright arm means 24 the pull pin 22 extends through one of the sets of aligned holes 30 or 31, and through the eye 21, to detachably secure the arm means 24 to the bracket 16 of the support arm 15. It can be seen from FIGS. 2 and 5 that in use the inwardly offset end portions of the arm members 25 flank the eye 21, and that in both positions the space between the arm members is unobstructed above the pintle 28.

Second and third connecting means for the second and third support arms each includes an attachment loop, like the loop 29, in the respective cable 11b or 11c.

As seen in FIG. 1, the first cable 11a and the upright arm means 24 are mounted with the pintle 28 in the same horizontal plane with the eye 18 on the bracket 17, and thus with the corresponding eye on the third arm of the support arm assembly 14.

As seen in FIG. 1, the silo unloader 13 is discharging material through an open door D in the wall W of the silo. As seen in FIG. 3, all the doors are closed, and material is being loaded into the silo through a filler spout F.

To change the arm means from the working setting of FIG. 2 to the filling setting of FIG. 5, the silo unloader is lowered onto the top of the material in the silo to take the tension off the cables, the pull pin 22 is removed from the aligned holes 30 in the arm members 25, and the arm members are inverted by swinging them as indicated by the arrow in FIG. 4 to bring the aligned holes 31 into register with the eye 21, whereupon the pull pin 22 is reinserted and the silo unloader may be raised to the position illustrated in FIG. 3 for filling the silo.

The foregoing detailed description has been given for clearness of understanding only and no unnecessary limitations should be understood therefrom as modifications will be obvious to those skilled in the art.

I claim:

1. In a silo unloader of the type having a tripod surmounting the wall of a cylindrical silo, three suspension sheaves journalled at the top of the tripod, three cables each of which is trained over one of the sheaves and hangs down in the silo, a silo unloader mechanism having three generally radially extending support arms each of which has a connection to one of said cables to suspend the unloader mechanism in the silo so that it may be raised and lowered, and there being a filler spout for loading material into the top of the silo, the improvement comprising:

the connection to one of said support arms includes an upright arm means on said one of said support arms, a pivotal connection between the cable and the upright arm means, and means for selectively positioning said pivotal connection in the plane of the other two cable connections or substantially above said plane, so the unloader may selectively occupy a horizontal working position for unloading or an inclined position when it is raised for filling the silo, the unloader in said inclined position having its high side above the filler spout.

2. The improvement of claim 1 in which the pivotal connection is permanently at one end of the upright arm means, and said upright arm means is inverted to change the plane of the pivotal connection.

3. The improvement of claim 2 in which the upright arm means comprises a pair of spaced arm members, there is a cross pintle mounted on both the spaced arm members, the cable is connected to said cross pintle, there is an eye fixed to said one of said support arms, and a removable pull pin extends through aligned holes in one end portion or the other of the spaced arm members and through said eye.

4. The improvement of claim 3 in which the end portions of the spaced arm members flank the eye, and the space between the arm members is unobstructed above the pintle in both positions of said arm members.

5. The improvement of claim 4 in which the pull pin is connected by a short length of chain to the support arm.

6. In a silo unloader of the type having a tripod surmounting the wall of a cylindrical silo, three suspension sheaves journalled at the top of the tripod, first, second and third cables each of which is trained over one of the sheaves and hangs down in the silo, a silo unloader mechanism having first, second and third generally radially extending support arms each of which has an outer end beneath a corresponding one of said cables, a fixed element on each of said outer ends, and first, second and third connecting means for the corresponding support arms each of which includes an attachment to the lower end of the corresponding one of said cables to suspend the unloader mechanism in the silo so that it may be raised and lowered, and there being a filler spout for loading material into the top of the silo, the improvement comprising:

said first connecting means includes means for selectively locating the attachment to the first cable in either of two positions relative to the fixed element on the first support arm so the unloader may selectively occupy a horizontal working position for unloading, or an inclined position when it is raised for filling the silo, the unloader in said inclined position having its high side above the filler spout.

7. The improvement of claim 6 in which the first connecting means comprises an upright arm means that has first and second ends, a pivotal connection between the attachment to the first cable and the first end of the upright arm means, and means for selectively securing either the first end or the second end of the upright arm means to the fixed element on the first support arm so as to position said pivotal connection either in the plane of the points of attachment on the other two cables or substantially above said plane.

8. The improvement of claim 7 in which the pivotal connection is permanently at the first end of the upright arm means, and said upright arm means is inverted to change the plane of the pivotal connection.

9. The improvement of claim 8 in which the upright arm means comprises a pair of spaced arm members, the pivotal connection comprises a cross pintle mounted on both the spaced arm members, the fixed element on the first support arm comprises an eye, and a removable pull pin extends through aligned holes in one end portion or the other of the spaced arm members and through said eye.

10. The improvement of claim 9 in which the end portions of the spaced arm members flank the eye, and the space between the arm members is unobstructed above the pintle in both positions of said arm members.

11. The improvement of claim 10 in which the pull pin in connected by a short length of chain to the first support arm.

* * * * *